United States Patent
Buchner et al.

(10) Patent No.: US 6,194,997 B1
(45) Date of Patent: Feb. 27, 2001

(54) ANTITHEFT SYSTEM FOR A MOTOR VEHICLE

(75) Inventors: Reiner Buchner, Sinzing; Thomas Roehrl, Barbing; Dieter Wagner, Laaber, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/360,943

(22) Filed: Jul. 26, 1999

(30) Foreign Application Priority Data

Jul. 24, 1998 (DE) .............................................. 198 33 451

(51) Int. Cl.$^7$ ................................................... B60R 25/10
(52) U.S. Cl. .......................... 340/426; 340/539; 340/542; 307/10.2
(58) Field of Search ..................................... 340/426, 539, 340/540, 457, 542, 545.3, 425; 307/10.2

(56) References Cited

U.S. PATENT DOCUMENTS 4,805,723 * 2/1989 Aoki et al. ............................ 180/289

FOREIGN PATENT DOCUMENTS 41 23 654 A1   1/1993 (DE) .
4123654   *   1/1993 (DE) .

* cited by examiner

*Primary Examiner*—Julie Lieu
(74) *Attorney, Agent, or Firm*—Herbert L. Lerner; Laurence A. Greenberg; Werner H. Stemer

(57) ABSTRACT

An antitheft system for a motor vehicle includes an interior monitoring device and a transceiver unit which are intended to detect the presence of a person or of a key in the interior of the motor vehicle and which are activated as soon as a door is closed. If a person is not detected in the interior, the doors are automatically locked without the user having to undertake particular measures for that purpose.

11 Claims, 4 Drawing Sheets

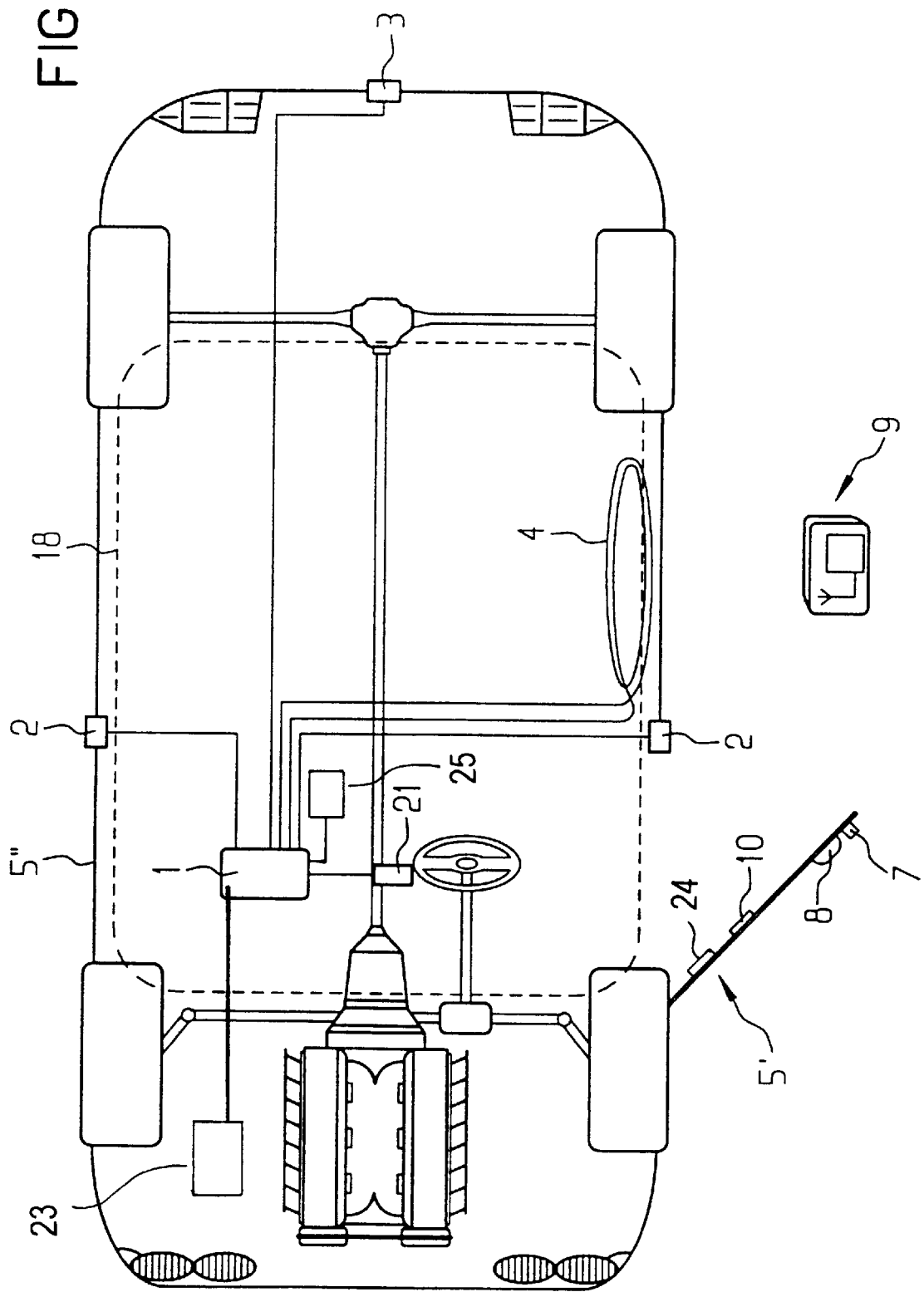

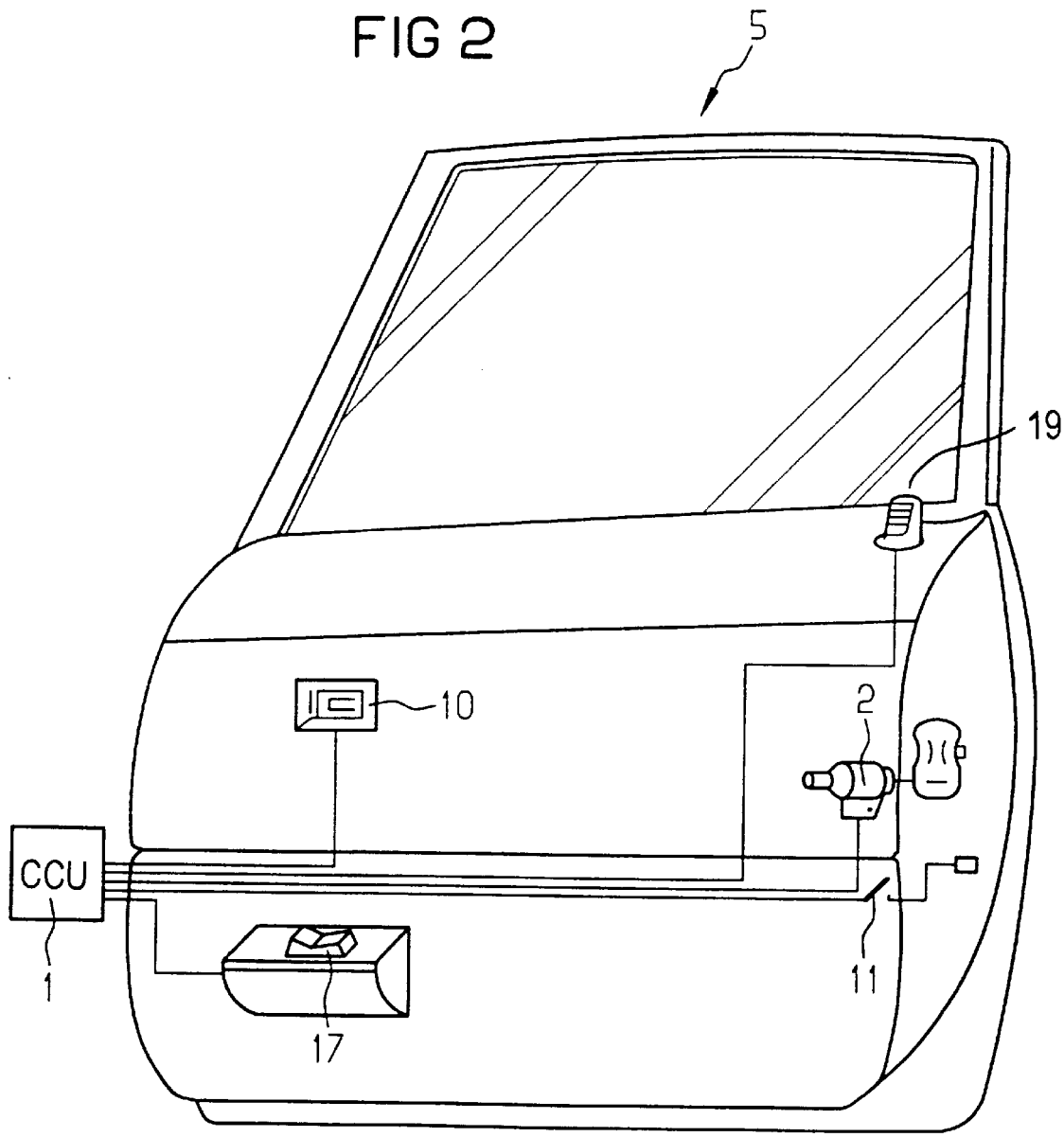

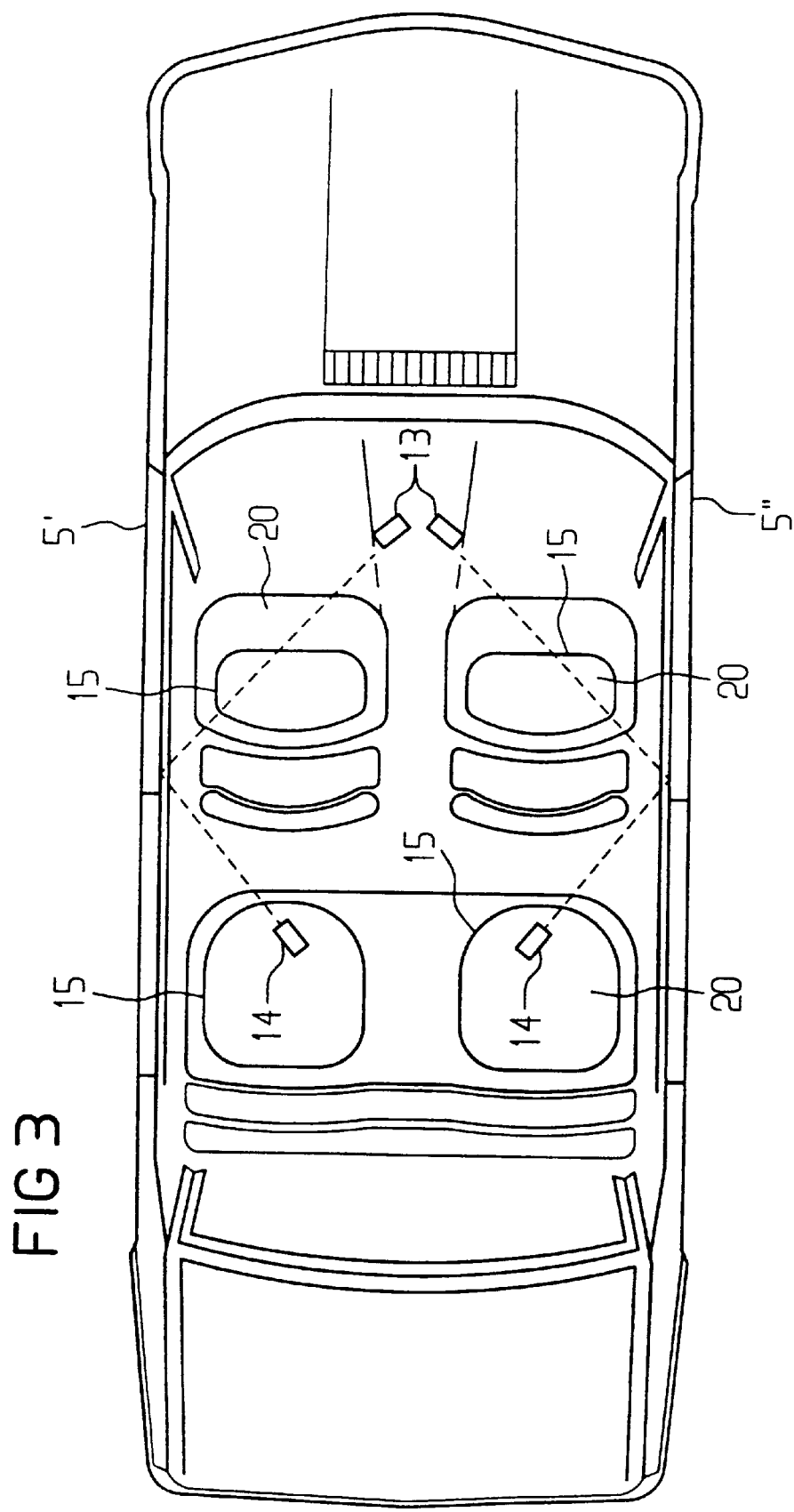

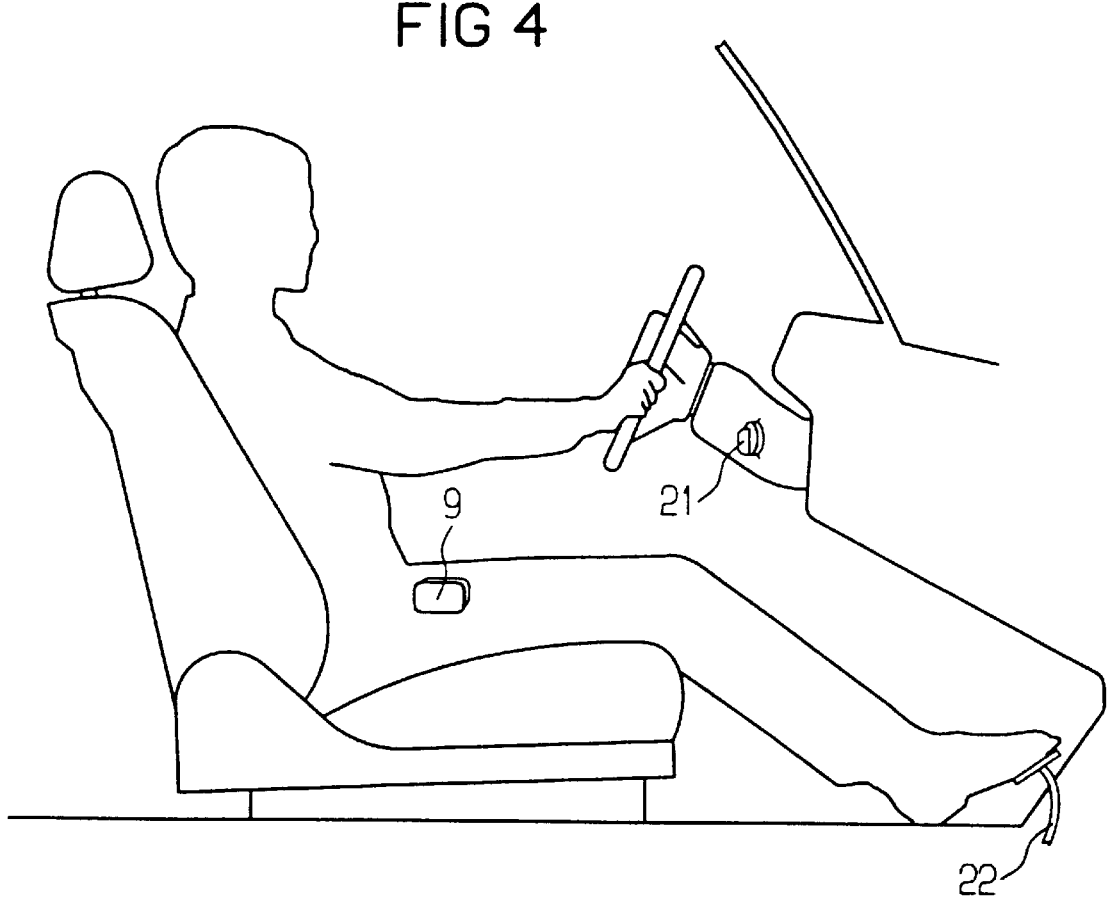

ANTITHEFT SYSTEM FOR A MOTOR VEHICLE

BACKGROUND OF THE INVENTION

Field of the Invention

The invention relates to an antitheft system for a motor vehicle in which locking or unlocking of one or more doors is made possible only after authorization is proven.

In antitheft systems for motor vehicles, in particular in the case of keyless access control systems, a request signal is transmitted to a portable code transmitter after triggering through the use of an activation switch on a door. The code transmitter responds automatically with its response signal if it has received the request signal. If the response signal itself is received in the motor vehicle and if it proves to be authorized after comparison with a reference signal expected there, the doors of the motor vehicle are locked or unlocked.

In an antitheft system which is known from German Published, Non-Prosecuted Patent Application DE 41 23 654 A1, a switch in the interior is activated when the occupants leave the motor vehicle. As a result, a request signal which firstly addresses the code transmitter in the interior is triggered.

If no signal is sent back by the code transmitter from the interior, the request signal is transmitted to the exterior. If a response signal is transmitted back from there, the vehicle can be locked, since it is assumed that the code transmitter is outside the motor vehicle. However, if the user with the code transmitter moves away from the vehicle too quickly, the motor vehicle may possibly no longer receive the response signal. The vehicle then remains unlocked.

In a further antitheft system which is known from U.S. Pat. No. 4,805,723, the doors of the motor vehicle are automatically locked if the doors are closed and no one is subsequently detected in the motor vehicle. However, in that context it may be the case that the driver has forgotten his or her key in the motor vehicle and can then no longer enter his or her motor vehicle again since it is already locked.

SUMMARY OF THE INVENTION

It is accordingly an object of the invention to provide an antitheft system for a motor vehicle, which overcomes the hereinafore-mentioned disadvantages of the heretofore-known devices of this general type and which provides a high degree of security against theft, even if a driver only briefly leaves his or her motor vehicle.

With the foregoing and other objects in view there is provided, in accordance with the invention, an antitheft system for a motor vehicle, comprising a central control unit connected to the locks for locking and unlocking the locks; a trigger switch connected to the control unit, the trigger switch sensing closing and opening of one of the doors; at least one antenna connected to the control unit for transmitting a request signal into the interior; a portable code transmitter for receiving the request signal and automatically transmitting back a response signal after previously receiving the request signal; and an interior monitoring device connected to the control unit, the interior monitoring device establishing if anyone is in the interior; the trigger switch activated by closing one of the doors to cause the control unit to activate the interior monitoring device and the at least one antenna to test for the presence of a person in the interior and to transmit the request signal into the interior, and the interior monitoring device causing the control unit to lock all of the door locks if no one is subsequently detected in the interior and no response signal is received.

When the door of the motor vehicle is locked, the interior monitoring device detects whether or not anyone is still in the interior. If this is not the case, a transceiver unit detects whether or not a valid code transmitter is present in the interior of the motor vehicle. If this is not the case either, the doors are automatically locked without the user having to perform a particular action to bring this about.

In accordance with another feature of the invention, the trigger switch is a door contact switch switched on and off by closing one of the doors associated with the door contact switch.

In accordance with a further feature of the invention, the at least one antenna also transmits the request signal into the exterior and the control unit monitors if a response signal is received from the exterior.

In accordance with an added feature of the invention, the user can be warned visually or audibly that there is still a person or a key in the interior of the vehicle.

In accordance with an additional feature of the invention, there is provided a switch in or on the motor vehicle which, when activated, prevents the doors of the motor vehicle from being locked under any circumstances.

In accordance with yet another feature of the invention, the interior monitoring device includes a seat occupation detection device having a capacitor with at least one electrode disposed in a seat.

In accordance with yet a further feature of the invention, the interior monitoring device has ultrasonic sensors or infrared sensors and ultrasonic receivers or infrared receivers for respectively transmitting and receiving signals and comparing the signals with stored patterns for detecting the presence of a person in the interior.

In accordance with yet an added feature of the invention, the at least one antenna is disposed within the motor vehicle and transmits the request signal only into the interior.

In accordance with yet an additional feature of the invention, the at least one antenna is a loop antenna having an air coil with a plurality of turns disposed between a door lining and a door panel of at least one of the doors.

In accordance with a concomitant feature of the invention, there are provided electric motors connected to the control unit for at least partially opening or completely closing at least one window, a sliding roof or a top as a function of the locking and unlocking.

Other features which are considered as characteristic for the invention are set forth in the appended claims.

Although the invention is illustrated and described herein as embodied in an antitheft system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, bottom-plan view of a motor vehicle containing a block circuit diagram of an antitheft system according to the invention;

FIG. 2 is an enlarged, perspective view of an interior of a door of a motor vehicle with parts of the antitheft system according to FIG. 1;

FIG. 3 is a fragmentary, top-plan view of an interior of a motor vehicle containing a block circuit diagram of an interior monitoring device of the antitheft system; and FIG. 4 is an enlarged, fragmentary, side-elevational view of a user on a driver's seat.

DESCRIPTION OF THE PREFERRED EMBODIMENTS

Referring now to the figures of the drawings in detail and first, particularly, to FIG. 1 thereof, there is seen an antitheft system for a motor vehicle which has a central control unit 1 that is connected to one or more (usually all) door locks 2, including a tailgate lock 3 and a possibly present, non-illustrated fuel tank flap lock. The control unit 1 also has a transceiver unit with at least one transceiver antenna 4. The antenna 4 is disposed in a door 5 (or tailgate) or at some other suitable point in the motor vehicle. Usually, a plurality of antennas 4 are disposed in the motor vehicle. It is possible to place one or more antennas 4 as loop antennas in each door 5 (between a door lining and a door panel) or one or more antennas 4 in external/internal mirrors as ferrite antennas. All of the antennas 4 are connected to the control unit 1.

A loop antenna including an air coil with a plurality of turns, can be disposed as an antenna 4 between the door lining and the door panel of one door or of each door. The winding of such a loop antenna can run along an outer frame of the door 5.

A ferrite antenna is composed of a coil which is wound onto a rod-shaped core made of a highly permeable material. The dimensions of the ferrite antennas may be made very small (1–2 cm length of the core) so that they can be disposed at any suitable point (for example in the internal mirror or in the external mirror) in the motor vehicle.

If a user wishes to get into his or her motor vehicle, firstly he or she manually activates an activation switch 7 which is disposed on the outside, for example on a door handle 8, or in its vicinity. Through the use of this activation switch 7, the control unit 1 is instructed to broadcast a coded request signal to the exterior through one or more of the antennas 4. If this request signal is received by a code transmitter (referred to below as a key) 9 carried by the user, it generates a coded response signal which is peculiar to it and which it automatically transmits back (this is also referred to as an interrogation/response dialog).

The response signal is compared in the control unit 1 with a reference signal which is stored and expected there (this is also referred to as authentication). If the two signals correspond, it is assumed that the key 9 is authorized to lock or unlock the door 5, so that one or more doors 5 can then be unlocked.

A steering lock or an immobilizer can also be released, together with the unlocking, so that the engine can be started and the motor vehicle can be used. This can at least already have been placed in a standby state so that when the driver wishes to start the motor vehicle the immobilizer and the steering lock can be released more quickly.

If the driver wishes to get out of his or her vehicle again, he or she firstly activates an internal handle 10 (FIG. 2) on the inside of the door 5. The door 5 is opened mechanically or electrically using the internal door handle 10. The internal door handle 10 can also be connected to the control unit 1 and to the door lock 2, as a result of which the door lock 2 is unlocked through the use of the control unit 1 by pulling on the internal door handle 10 if the door lock 2 was previously locked. After getting out of the vehicle, the user can close the door 5 again. When the door is closed, a trigger switch 11, which in this exemplary embodiment is a door contact switch that is present in any case, is actuated. This trigger switch 11 is connected to the control unit 1 and it communicates to the control unit 1 that the door 5 has been closed.

As soon as the door 5 is closed, an interior monitoring device 13, 14, 15, which is also connected to the control unit 1, is activated. The interior monitoring device 13, 14, 15 is used to test whether or not there is still anyone in the interior. In addition, the closed door 5 actuates the control unit 1 so that it causes the antenna 4 to transmit the request signal into the interior of the motor vehicle and it simultaneously monitors to determine whether or not a response signal is subsequently received. If a response signal is received, it is possible to check whether or not the response signal originates from the key 9 used by the driver when he or she got into the motor vehicle. If this is the case, it can be assumed that the driver has forgotten his or her key 9 in the interior. If the response signal originates from other keys which, even though they are assigned to the motor vehicle, have not previously been used to unlock it, these keys may be temporarily switched to an invalid state, since it can be assumed that the driver has his or her key 9 on him or her. The doors 5 can then be unlocked.

If a person or a valid key 9 (a key which is assigned to the motor vehicle and is authorized to lock or unlock the door locks 2) is located in the interior, the doors 5 cannot be unlocked. However, if it is detected that there is neither a person nor a valid key 9 in the interior, the doors 5 are automatically locked. The driver does not need to activate any special switches for this purpose in order to lock the doors 5. The trigger for the locking operation is the closed door 5, which was still open just prior to that time.

If the user does not wish the vehicle to be locked after he or she gets out, he or she can actuate a prevention switch 17. This prevention switch 17 may be disposed on the outside of the door in the vicinity of the door handle 8, on the inside of the door 5 (as is illustrated in FIG. 2) or on the dashboard. The prevention switch 17 is connected to the control unit 1. When the prevention switch 17 is actuated, the control unit 1 is instructed that it should neither activate the interior monitoring device 13, 14, 15 nor cause the request signal to be transmitted. As a result, the control unit 1 is prevented from locking the door locks 2, 3.

The function of the trigger switch 11 can be assumed by the door contact switch which is present in any case. The latter switches when the door 5 is locked and opened. Usually, the door contact switch switches an interior light on and off if the user opens or closes the door 5. The door contact switch is used in this case in order to communicate to the control unit 1 that a door 5 has been closed. This ensures that the doors 5 can be locked whenever the user gets out of his or her vehicle, even if only briefly, and closes the door behind him or her. However, it is not permissible for a person or a valid key 9 to remain in the interior of the motor vehicle, since otherwise locking does not take place.

The trigger switch 11 can also be some other kind of switch, for example in the form of a photoelectric barrier or a proximity sensor which senses the opening and closing of the door 5 and subsequently transmits a signal to the control unit 1. This signal then triggers the interrogation relating to persons or a key 9 in the interior. In their absence, locking is automatically performed.

This has the advantage of permitting the user to get out briefly, for example in order to refuel, and to move away from his or her vehicle without the antitheft protection for the motor vehicle being disabled. However, a condition is that the driver has his or her key 9 on him or her. This is, however, customary, in particular in the case of so-called lockless or keyless access control systems since the user does not have to introduce the key 9 into a lock. A thief or intruder cannot get into the motor vehicle in the meantime, or can do so only under very difficult conditions. If the user does not return to his or her motor vehicle particularly quickly (because he or she wishes to park his or her vehicle for a relatively long time), he or she does not need to perform any particular measures since his or her vehicle is locked in any case.

It is possible for the antitheft system to be switched on simultaneously with the locking, as a result of which the vehicle is continuously monitored (as long as it is locked) for the intrusion of a person into the interior of the vehicle or for a movement of the motor vehicle (for example when it is towed away) and when an indication of an unauthorized contact with the motor vehicle is detected an alarm is triggered.

The antenna 4 must be constructed in such a way that it transmits the request signal just into the interior or, if appropriate, just to the exterior, depending on the request. The antenna 4 has a range and transmission characteristic 18 (dashed line in FIG. 1) which are matched in this case to the interior of the respective type of motor vehicle.

The range and the transmission characteristic 18 can be matched to the conditions in the interior through the use of the structure of the antenna 4 (by constructing the antenna as a coil with a number of turns and a specific quality, by defining a mounting location of the antenna 4, and by setting an amplitude and a phase of a transmission current and a geometric shape of the antenna 4, etc.). Since the body of most vehicles is made of metal, the electromagnetic field of the antenna 4 which is disposed in the interior of the vehicle is attenuated so that the field does not extend into the interior, or only just so to a very small degree.

One or more antennas 4 can also be mounted on the exterior of the vehicle body (for example in the external mirror) so that they then irradiate into the exterhor. This can be used to transmit the request signal a second time, after the first transmission into the interior, specifically into the exterior. If the key 9 is addressed in the exterior after the door 5 has closed and if it transmits back its response signal, there is an additional security that the key 9 is also actually located outside the vehicle.

The vehicle may have a warning device which is also connected is to the control unit 1. As soon as the presence of a person or a key 9 in the interior of the vehicle is detected, a visual or audible warning signal is emitted. As a result, the user is alerted to the fact that there is still a person or a key 9 in the vehicle, and the vehicle is therefore not locked.

The warning device may be part of an antitheft system which is present in any case and which is usually activated if the vehicle is locked. If someone intrudes into the vehicle, a visual alarm (flashing lights) or an audible alarm 23 (intermittently operated horn) is triggered.

The control unit 1 can also be connected to one or more electric motors. Electric motors 24 can be used, for example, to completely close the windows and electric motors 25 can be used, for example, to completely close a top or a sliding roof if the motor vehicle is automatically locked. It is also possible to leave the windows open a small amount when locking is performed.

Thus, the user has the possibility of still getting into his or her vehicle, admittedly with increased effort, by pulling up a locking knob 19 on the inside of the doors 5 from the outside. This knob 19 causes the vehicle to be unlocked. However, this should only be an emergency measure if the key 9 is left in the interior. Therefore, it should only be possible to reach the locking knob 19, and thus unlock the door locks 2, 3, with difficulty. This nevertheless prevents a thief from getting into the vehicle quickly since the windows are only left open a small amount if the driver has briefly left his or her vehicle.

The interior monitoring device 13, 14, 15 can be an ultrasonic monitoring system 13, 14 (as is illustrated in FIG. 3) which is nevertheless present in the vehicle. This ultrasonic monitoring system 13, 14 is used to monitor whether or not anyone enters the vehicle when the vehicle is parked. For this purpose, sound signals, which are received by ultrasonic receivers 14, are broadcast by ultrasonic transmitters 13. If the received sound signals deviate significantly from stored patterns, someone has entered the motor vehicle. This ultrasonic monitoring system 13, 14 can be used to monitor the interior after the door 5 has been closed, in order to determine whether or not there is anyone in the interior.

Instead of ultrasonic sound, other methods, such as infrared or radio, can be used in order to detect the presence of persons in the interior.

Instead of an ultrasonic monitoring system 13, 14, a seat occupation detection system may also be used. The latter has a capacitor with at least one electrode 15 in each seat 20 (driver's seat, front passenger's seat and rear seat) and a corresponding electrode which is formed by the vehicle body. A person on a seat 20 constitutes a dielectric which is introduced into the capacitor, and as a result of which the capacitance of the capacitor changes in comparison with an unoccupied seat 20. The seat occupation detection system can thus be used to detect whether or not there is still anyone in the interior after the doors 5 have closed.

The seat occupation system can also function with the aid of weight sensors (for example strain gages) in which the weight on the seats 20 is sensed. As soon as a threshold value is exceeded, it is assumed that a person has sat down on a seat.

The trigger switch 11 can be disposed either in a driver's door 5' or in a front passenger's door 5". If a person gets out through the front passenger's door 5", the interior is also monitored for the presence of a person or of the key 9. If the driver is still seated on the driver's seat, the vehicle is not locked.

The external shape of the key 9 is irrelevant to the invention. The key 9 can thus be in the form of a check card-like card or in the form of a conventional mechanical key 9. It is essential that it has a transponder which can receive the request signal and which can automatically transmit back the response signal generated in it.

The antennas 4 are constructed or driven in such a way that the request signal also gets into every corner of the interior. In particular, the request signal must arrive at an ignition lock 21 (FIG. 4) in which the key 9 may be inserted. Likewise, the request signal must also be capable of penetrating side compartments of the door 5 or a storage compartment on the dashboard. This is the only way to ensure that the key 9 is detected even if it is located in remote corners of the interior of the vehicle.

When he or she enters the motor vehicle, the user firstly activates the activation switch 7 in the vicinity of the door handle. The request signal is then triggered and, if the request signal is received by the key 9, the response signal is transmitted back through the key 9. If authorization takes place, the doors 5 are unlocked so that the driver can enter his or her vehicle.

The activation of the lock 2 or of the locks 2, 3, or the switching of the trigger switch 11, can be utilized as a preliminary signal or as a wakeup signal for the immobilizer. Thus, a further interrogation/response dialog between the key 9 and the control unit 1 in the interior of the vehicle can be carried out more quickly if the user has sat down on the driver's seat 20, activates a brake pedal 22 or clutch and additionally activates an ignition switch. This preliminary signal can also be utilized to disarm the antitheft system so that the entry of the authorized driver does not lead to an alarm.

The ignition switch or starter switch can also be formed by a proximity sensor (inductive or pyro-electrical). As soon as the user approaches with his or her hand, the interrogation/response dialog starts. As a result, the interrogation/response dialog is terminated more quickly. The user thus detects no difference from conventional systems in which no authorization interrogation takes place before the motor vehicle is started.

As soon as the key 9 is detected as authorized by the interrogation/response dialog in the interior of the vehicle, the immobilizer can be triggered. The user can thus start his or her vehicle and drive away. However, if the key 9 is not detected in the interior of the vehicle at this time, it is assumed that it is not desired to attempt to start the vehicle and the release of the immobilizer is not made possible.

An interrogation/response dialog can also be carried out when the engine is switched off again. However, this can take place only if the motor vehicle is actually stationary and, if appropriate, the brake pedal 22 is actuated or the transmission goes into a parked setting. A restricted interrogation/response dialog, in which it is not necessary to transmit the full request signal or the full response signal, is sufficient to switch off the engine.

With the antitheft system according to the invention, the driver can get out of his or her vehicle for a certain intermediate period without expressly issuing an instruction to lock the vehicle. Nevertheless, the motor vehicle is locked. During his or her absence, it is not possible for anyone to enter the vehicle quickly and to steal the vehicle or misappropriate objects in the vehicle.

The antitheft system can also have a further warning device which triggers an alarm if the key 9 is detected neither in the interior nor in the exterior after the user has gotten out. It is advantageous then if the doors 5 remain unlocked for a brief period after the door 5 is locked. The driver thus has the option of opening a door 5 again quickly in order, if appropriate, to search for his or her key 9. This is because it is possible that the key 9 may neither be able to receive the request signal nor transmit the response signal due to some fault or another.

The antenna 4 transmits the request signal. It can also receive a response signal. The response signal can also be received by another antenna disposed in the motor vehicle.

The antenna 4 does not necessarily have to be constructed as a coil. The antenna can also transmit and receive the signals visually, audibly or by radio, instead of by induction. However, it is essential for the invention that it can transmit the request signal in a way which is limited to the interior so that the possible presence of a valid key 9 in the interior can be detected.

What is claimed is:

1. In a motor vehicle having an interior and an exterior, locks and doors, an antitheft system, comprising:

a central control unit connected to the locks for locking and unlocking the locks;

a trigger switch connected to said control unit, said trigger switch sensing closing and opening of one of the doors;

at least one interior antenna connected to said control unit for transmitting a request signal into the interior;

an exterior antenna connected to said control unit for transmitting a request signal into the exterior;

a portable code transmitter for receiving the request signal and automatically transmitting back a response signal after previously receiving the request signal; and an interior monitoring device connected to said control unit, said interior monitoring device establishing if anyone is in the interior;

said trigger switch activated by closing one of the doors to cause said control unit to activate said interior monitoring device and said at least one interior antenna and said exterior antenna to test for the presence of a person in the interior and to transmit the request signal into the interior and the exterior, and said control unit locking all of the door locks if no one is subsequently detected in the interior and exterior and no response signal is received.

2. The antitheft system according to claim 1, wherein said trigger switch is a door contact switch switched on and off by closing one of the doors associated with said door contact switch.

3. The antitheft system according to claim 1, wherein said at least one antenna also transmits the request signal into the exterior and said control unit monitors if a response signal is received from the exterior.

4. The antitheft system according to claim 1, including a warning device connected to said control unit for emitting a visual or audible warning signal if a person is present in the interior of the vehicle or if the response signal is received from the interior.

5. The antitheft system according to claim 1, including a prevention switch disposed at the motor vehicle for disabling functioning of said control unit when said prevention switch is activated manually to prevent the locks from being locked.

6. The antitheft system according to claim 1, wherein said interior monitoring device includes a seat occupation detection device having a capacitor with at least one electrode disposed in a seat.

7. The antitheft system according to claim 1, wherein said interior monitoring device has ultrasonic sensors and ultrasonic receivers for respectively transmitting and receiving signals and comparing the signals with stored patterns for detecting the presence of a person in the interior.

8. The antitheft system according to claim 1, wherein said interior monitoring device has infrared sensors and infrared receivers for respectively transmitting and receiving signals and comparing the signals with stored patterns for detecting the presence of a person in the interior.

9. The antitheft system according to claim 1, wherein said at least one antenna is disposed within the motor vehicle and transmits the request signal only into the interior.

10. The antitheft system according to claim 9, wherein said at least one antenna is a loop antenna having an air coil with a plurality of turns disposed between a door lining and a door panel of at least one of the doors.

11. The antitheft system according to claim 1, including electric motors connected to said control unit for at least partially opening or completely closing at least one window, a sliding roof or a top as a function of the locking and unlocking.

* * * * *